(12) United States Patent
Roberts

(10) Patent No.: US 7,304,609 B2
(45) Date of Patent: Dec. 4, 2007

(54) HYBRID WIRELESS RANGING SYSTEM AND ASSOCIATED METHODS

(75) Inventor: Richard D. Roberts, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 279 days.

(21) Appl. No.: 11/090,513

(22) Filed: Mar. 25, 2005

(65) Prior Publication Data

US 2006/0214848 A1    Sep. 28, 2006

(51) Int. Cl.
  *G01S 1/24* (2006.01)
  *G01S 13/08* (2006.01)
  *G01S 5/04* (2006.01)
(52) U.S. Cl. .................. 342/387; 342/118; 342/126; 342/127; 342/437
(58) Field of Classification Search ............. 342/458, 342/375, 463, 387, 125, 118, 127, 126, 133, 342/139, 437; 701/17, 200, 213, 225; 455/434, 455/450, 73; 370/348; 341/19; 607/60
See application file for complete search history.

(56) References Cited

U.S. PATENT DOCUMENTS

| | | | | |
|---|---|---|---|---|
| 3,040,315 A * | 6/1962 | Kramer | ................. | 342/385 |
| 3,150,372 A * | 9/1964 | Groth, Jr. | ................. | 342/458 |
| 3,760,414 A * | 9/1973 | Nicolson | ................. | 342/21 |
| 4,016,553 A * | 4/1977 | Novikoff et al. | ......... | 340/572.7 |
| 4,740,792 A * | 4/1988 | Sagey et al. | ................. | 342/457 |
| 4,797,679 A * | 1/1989 | Cusdin et al. | ............... | 342/387 |
| 5,126,746 A * | 6/1992 | Gritton | ................. | 342/125 |
| 5,285,209 A * | 2/1994 | Sharpin et al. | ............. | 342/424 |
| 5,589,838 A | 12/1996 | McEwan | ................. | 342/387 |
| 6,002,708 A | 12/1999 | Fleming et al. | ............. | 375/200 |
| 6,054,950 A | 4/2000 | Fontana | ................. | 342/463 |
| 6,133,876 A | 10/2000 | Fullerton et al. | .......... | 342/375 |
| 6,388,618 B1 * | 5/2002 | Stilp et al. | ................. | 342/457 |
| 6,700,535 B2 | 3/2004 | Gilkes et al. | ............... | 342/387 |
| 6,901,264 B2 * | 5/2005 | Myr | ................. | 455/456.5 |
| 7,050,817 B2 * | 5/2006 | Olaker | ................. | 455/456.1 |
| 2003/0119453 A1 * | 6/2003 | Blatz et al. | ................. | 455/73 |
| 2004/0032363 A1 * | 2/2004 | Schantz et al. | ............. | 342/127 |
| 2004/0070534 A1 | 4/2004 | Halsey et al. | ............... | 342/442 |
| 2005/0282558 A1 * | 12/2005 | Choi et al. | ............... | 455/456.1 |

* cited by examiner

*Primary Examiner*—Thomas H. Tarcza
*Assistant Examiner*—Hien Ly
(74) *Attorney, Agent, or Firm*—Allen, Dyer, Doppelt, Milbrath & Gilchrist, P.A.

(57) ABSTRACT

A wireless ranging system includes a first wireless unit and a second wireless unit spaced therefrom. The first wireless unit may include a time-of-arrival (TOA) wireless transmitter, and a near-field electromagnetic (NFE) wireless transmitter having a settable operating frequency. The second wireless unit may include a TOA wireless receiver cooperating with the TOA wireless transmitter, a NFE wireless receiver cooperating with the NFE wireless transmitter, and a ranging processor cooperating with the TOA wireless receiver. The ranging processor may generate a range estimate between the first and second wireless units, and generate an estimated operating frequency for the NFE wireless transmitter based upon the range estimate. The ranging processor may also generate a range window for the TOA wireless receiver via the ranging processor cooperating with the NFE wireless receiver, and use the range window with the TOA wireless receiver to generate a range estimate between the first and second wireless units.

32 Claims, 7 Drawing Sheets

HYBRID WIRELESS RANGING SYSTEM AND ASSOCIATED METHODS

FIELD OF THE INVENTION

The invention relates to the field of ranging systems, and, more particularly, to wireless ranging and related methods.

BACKGROUND OF THE INVENTION

Wireless ranging may be used to determine a range between two wireless units. This may be helpful information for firefighters working on different floors or rooms in a building, for example. The Global Positioning System (GPS) is a common wireless position determining system that can be used to determine a position on the earth. The GPS position information could be reported to another firefighter; however, GPS has line-of-sight requirements that prevent the system from working reliably underground or in other enclosed spaces.

A typical form of wireless ranging uses time-of-arrival (or time-of-flight) processing to determine a range between two wireless units. For example, if the units are time synchronized, a first unit can include a time-of-arrival transmitter to send a signal to a time-of-arrival receiver at a second unit. A processor at the second unit can determine a range between the units based on the time required for the signal to travel between the units. Unfortunately, a time-or-arrival signal may be reflected off of near-by surfaces so that multi-path interference at the receiver reduces the accuracy of range determination.

U.S. Pat. No. 6,054,950 to Fontana discloses a wireless ranging system that includes an array of ultra-wideband (UWB) transceivers that transmit signals to a node having an UWB receiver and a processor. The processor calculates time-of-flight measurements of the signals received from the UWB array of transceivers to determine the node's geolocation. Similarly, U.S. Pat. No. 5,589,838 to McEwan discloses a wireless transmitter that transmits a signal to an array of receivers connected to a processor. The processor measures the time-of-flight of the signal's arrival at each individual receiver to determine the transmitter's location.

U.S. Pat. No. 6,133,876 to Fullerton et al. discloses an UWB impulse radio ranging system including a first transceiver having a first clock that generates a first reference signal, and a second transceiver having a second clock, which generates a second reference signal. The first reference signal is used to synchronize the second transceiver and the second reference signal is used to synchronize the first transceiver. A delayed first reference signal is then transmitted and the difference between the first reference signal and the delayed first reference signal is used to determine the distance between the first and second transceivers.

Another type of wireless ranging system is disclosed U.S. Patent Application Publication No. 2004/0032363 to Schantz et al. This patent discloses near-field electromagnetic ranging using a receiver and processor to determine the phase difference between the electric field and the magnetic field in an electromagnetic wave transmitted from received from another wireless unit. Unfortunately, the operating frequency needs to bear a predetermined relationship to the actual range.

Unfortunately, the prior art wireless ranging systems each have some shortcomings. For example, GPS suffers from line-of-sight restrictions. Time-of-arrival ranging suffers from multi-path interference in certain environments. Near-field electromagnetic ranging requires that the operating frequency be properly related to the actual range.

SUMMARY OF THE INVENTION

In view of the foregoing background, it is therefore an object of the invention to provide a wireless ranging system and associated method for providing accurate ranging, such as in building-type environments.

This and other objects, features, and advantages in accordance with the invention are provided by a wireless ranging system including a first wireless unit and a second wireless unit spaced therefrom. The first wireless unit may include a time-of-arrival wireless transmitter, and a near-field electromagnetic wireless transmitter having a settable operating frequency. The second wireless unit may include a time-of-arrival wireless receiver cooperating with the time-of-arrival wireless transmitter, a near-field electromagnetic wireless receiver cooperating with the near-field electromagnetic wireless transmitter, and a ranging processor cooperating with the time-of-arrival wireless receiver. The ranging processor may generate a range estimate between the first and second wireless units, and generate an estimated operating frequency for the near-field electromagnetic wireless transmitter based upon the range estimate. Accordingly, the invention provides a wireless ranging system that provides accurate ranging, such as in building-type environments.

The ranging processor may also cooperate with the near-field electromagnetic wireless receiver to estimate a range window for the time-of-arrival wireless receiver. In addition, the ranging processor may iteratively set the operating frequency for the near-field electromagnetic wireless transmitter and range window for the time-of-arrival wireless receiver.

The second wireless unit may further include a back-channel transmitter to transmit the estimated operating frequency for the near-field electromagnetic wireless transmitter to the first wireless unit. The first wireless unit may further include a back-channel receiver cooperating with the back-channel transmitter to set the operating frequency of the near-field electromagnetic wireless transmitter.

The time-of-arrival wireless transmitter may comprise an UWB time-of-arrival wireless transmitter, and the time-of-arrival wireless receiver may comprise an UWB time-of-arrival wireless receiver. The near-field electromagnetic wireless transmitter may comprise an ultra-narrowband (UNB) near-field electromagnetic wireless transmitter, and the near-field electromagnetic wireless receiver may comprise an UNB near-field electromagnetic wireless receiver. The UNB near-field electromagnetic wireless receiver may operate using a near-field phase alignment, a near-field signal strength measurement, and/or near-field phase differences.

The operating frequency of the near-field electromagnetic wireless transmitter may define an operating wavelength between 0.05 to 0.5 times a range between the first and second wireless units. The second wireless unit may further include an originating time-of-arrival transmitter, and the first wireless unit may further include a relay time-of-arrival receiver cooperating with the originating time-of-arrival transmitter and the time-of-arrival transmitter to provide roundtrip time-of-arrival ranging.

A method aspect of the invention is for wireless ranging using a first wireless unit and a second wireless unit spaced therefrom. The first wireless unit may include a time-of-arrival wireless transmitter, and a near-field electromagnetic wireless transmitter having a settable operating frequency.

The second wireless unit may include a time-of-arrival wireless receiver cooperating with the time-of-arrival wireless transmitter, a near-field electromagnetic wireless receiver cooperating with the near-field electromagnetic wireless transmitter, and a ranging processor connected to the time-of-arrival wireless receiver and the near-field electromagnetic wireless receiver. The method may include generating a range estimate between the first and second wireless units via the ranging processor cooperating with the time-of-arrival wireless receiver, and generating an estimated operating frequency for the near-field electromagnetic wireless transmitter based upon the range estimate. The method may also include generating a range window for the time-of-arrival wireless receiver via the ranging processor cooperating with the near field electromagnetic wireless receiver, and using the range window with the time-of-arrival wireless receiver to generate a range estimate between the first and second wireless units.

DETAILED DESCRIPTION OF THE PREFERRED EMBODIMENTS

The invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
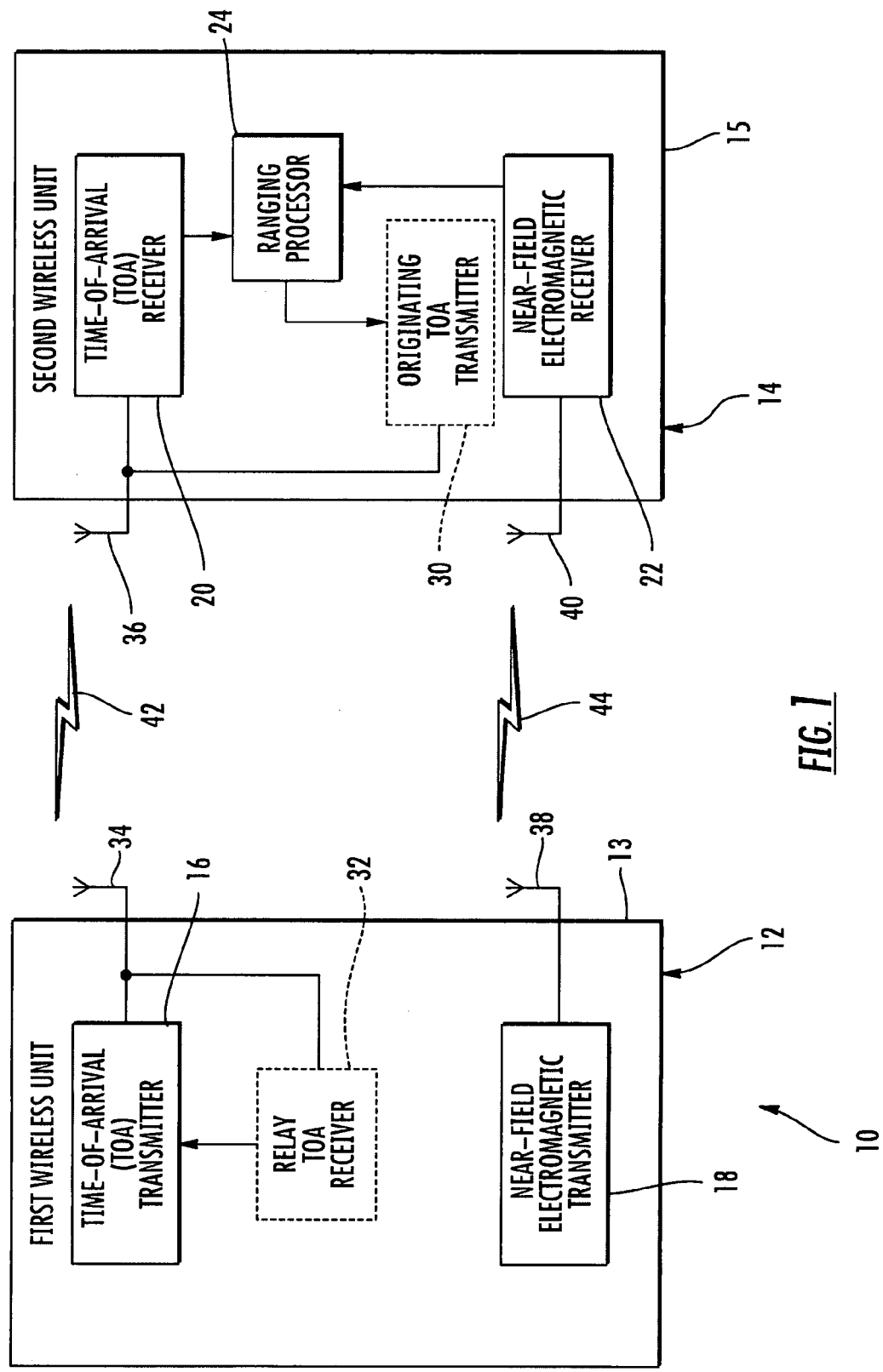
FIG. 1 is a schematic block diagram of one embodiment of a wireless ranging system in accordance with the invention.

Referring initially to FIG. 1, a wireless ranging system 10 in accordance with the invention is now described. The wireless ranging system 10 includes a first wireless unit 12 and a second wireless unit 14 spaced therefrom. The first wireless unit 12 includes a time-of-arrival wireless transmitter 16, and a near-field electromagnetic wireless transmitter 18 having a settable operating frequency, for example, carried by a first housing 13.

The second wireless unit 14 includes a time-of-arrival wireless receiver 20 cooperating with the time-of-arrival wireless transmitter 16, a near-field electromagnetic wireless receiver 22 cooperating with the near-field electromagnetic wireless transmitter 18, and a ranging processor 24 cooperating with the time-of-arrival wireless receiver contained within a second housing 15. The ranging processor 24 may generate a range estimate between the first and second wireless units, and generate an estimated operating frequency for the near-field electromagnetic wireless transmitter 22 based upon the range estimate, for example.

The ranging processor 24 may cooperate with the near-field electromagnetic wireless receiver 22 to estimate a range window for the time-of-arrival wireless receiver 20, for example. The ranging processor 24 can iteratively set the operating frequency for the near-field electromagnetic wireless transmitter 18 and the range window for the time-of-arrival wireless receiver 20.

The second wireless unit 14 can further include an originating time-of-arrival transmitter 30, and the first wireless unit 12 can further include a relay time-of-arrival receiver 32 cooperating with the originating time-of-arrival transmitter and the time-of-arrival transmitter 16 to provide roundtrip time-of-arrival ranging. The originating time-of-arrival transmitter 30 and the relay time-of-arrival receiver 32 are illustrated in dashed lines to indicate their optional nature.

The time-of-arrival transmitter 16 and the relay TOA receiver 32 are connected to a first antenna 34, for example. The time-of-arrival receiver 20 and the originating TOA transmitter 30 are connected to a second antenna 36. The first antenna 34 and the second antenna 36 can each include more than one antenna and can communicate with each other over a first wireless communication link 42 as will be appreciated by those skilled in the art.

Similarly, near-field electromagnetic transmitter 28 is connected to a third antenna 38, and the near-field electromagnetic receiver 22 is connected to a fourth antenna 40. The third antenna 38 and the fourth antenna 40 can each include more than one antenna and can communicate with each other over a second wireless communication link 44.

Figure 2:
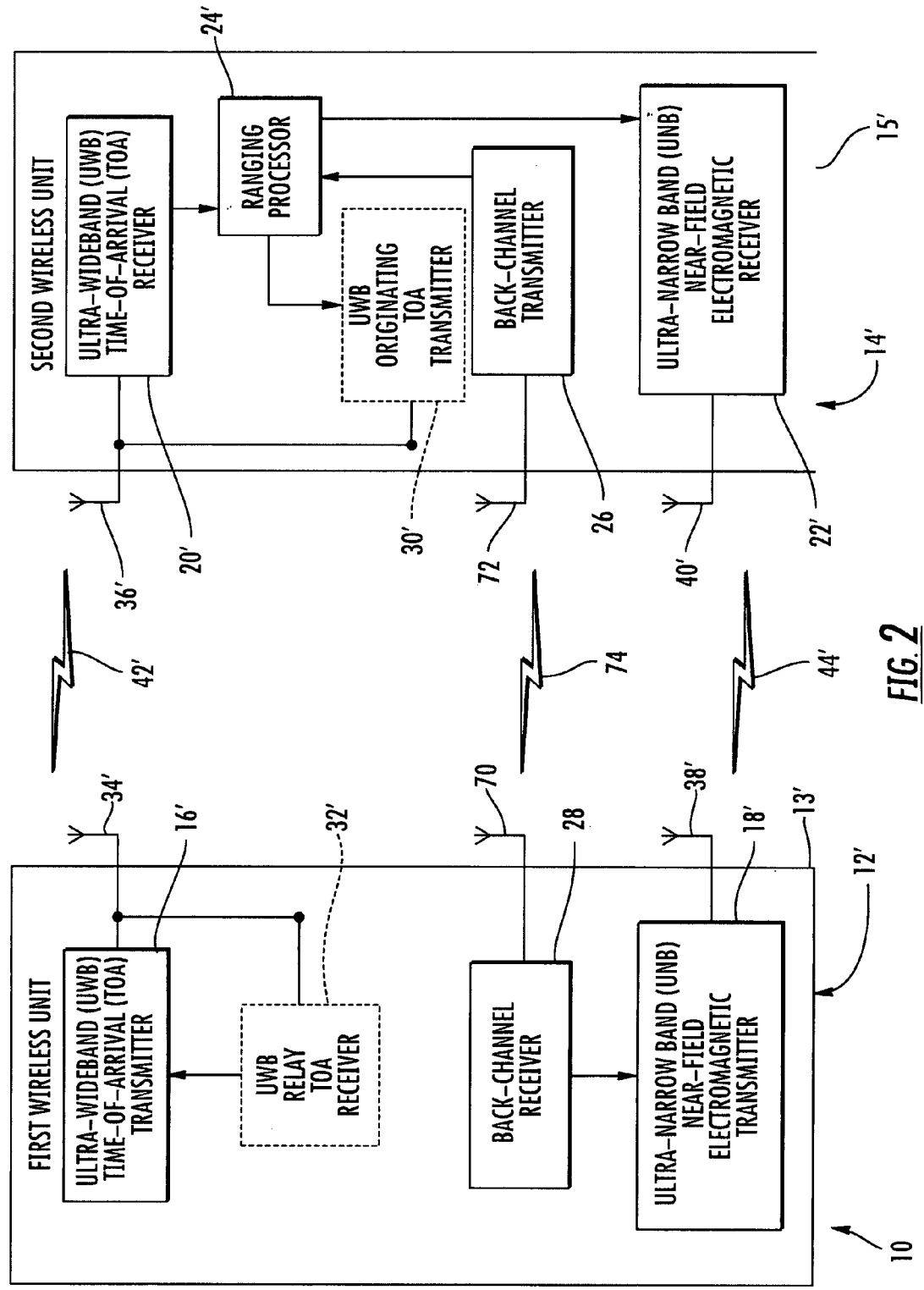
FIG. 2 is a schematic block diagram of another embodiment of a wireless ranging system in accordance with the invention.

Turning now additionally to the embodiment of the wireless ranging system 10' of FIG. 2, the second wireless unit 14' can further include a back-channel transmitter 26 to transmit the estimated operating frequency for the near-field electromagnetic wireless transmitter 18' to the first wireless unit 12', for example. The first wireless unit 12' can further include a back-channel receiver 28 cooperating with the back-channel transmitter 26' to set the operating frequency of the near-field electromagnetic wireless transmitter 18'.

The back-channel receiver 28 is connected to a fifth antenna 70 and the back-channel transmitter 26 is connected to a sixth antenna 72. The fifth antenna 70 and the sixth antenna 72 can each include more than one antenna and can communicate with each other over a third wireless communication link 74 as will be appreciated by those skilled in the art.

The time-of-arrival wireless transmitter 16' comprises an ultra-wideband time-of-arrival wireless transmitter, and the time-of-arrival wireless receiver 20' may comprise an ultra-wideband time-of-arrival wireless receiver, for example. The ultra-wideband technique is disclosed in, *Rapid acquisition for Ultra-Wideband Localizers*, R. Fleming, C. Kushner, G. Roberts, U. Nandiwada, AEther Wire & Location, Inc. 2002 IEEE Conference on Ultra Wideband Systems and Technologies, Baltimore, U.S. Pat. No. 6,133,876 to Fullerton, et al., and U.S. Pat. No. 6,054,950 to Fontana, the entire subject matter of which are incorporated herein by reference in their entirety.

The near-field electromagnetic wireless transmitter 18' illustratively comprises an ultra-narrowband near-field electromagnetic wireless transmitter, and the near-field electromagnetic wireless receiver 22' comprises an ultra-narrowband near-field electromagnetic wireless receiver, for example. The ultra-narrowband near-field electromagnetic wireless receiver 22' may operate using a near-field phase alignment, a near-field signal strength measurement, and/or near-field phase differences as will be appreciated by those skilled in the art. The operating frequency of the near-field electromagnetic wireless transmitter 18' may define an operating wavelength between 0.05 to 0.5 times a range between the first and second wireless units, for example, as will be appreciated by those skilled in the art.

The ability to measure the range between two wireless devices, based upon propagation time, is the basis for time-of-arrival (TOA) ranging or localization. A related technique to TOA is the time-difference-of-arrival (TDOA) algorithm. Both techniques are based upon measuring the propagation time and for simplicity only with the TOA technique is discussed. The TOA technique is disclosed in, *Ranging in a Dense Multipath Environment Using an UWB Radio Link*, J-Y. Lee, R. A. Scholtz, Ultra-Wideband Radio Laboratory, University of Southern California, IEEE Journal on Selected Areas in Communications, Vol. 20, No. 9, December 2002, and in U.S. Pat. No. 6,002,708 to Fleming et al., the entire subject matter of which are incorporated herein by reference in their entirety.

The TOA technique measures the signal round-trip Time-Of-Flight (TOF) between two wireless units. One TOA technique uses two asynchronous wireless units and a two-way remote synchronization technique. For instance, a pair of wireless units is time-multiplexed with half-duplex packet exchanges. This procedure relies on a typical mechanism for simultaneous location and communication in which a first wireless unit sends packets to a second wireless unit, which replies after synchronizing with packets containing synchronous timing information. The reception of this response allows the second wireless unit to determine the round-trip TOF information. The approach taken to calculate the position of a first wireless unit is done in using geometric interpretation to calculate the intersection of circles for TOA-based algorithms.

TOA techniques work well in non-multipath environment, but in a multi-path environment, the ability to measure the "direct line-of-sight" flight path (which is the range) becomes obscured by multi-path components.

Figure 3:
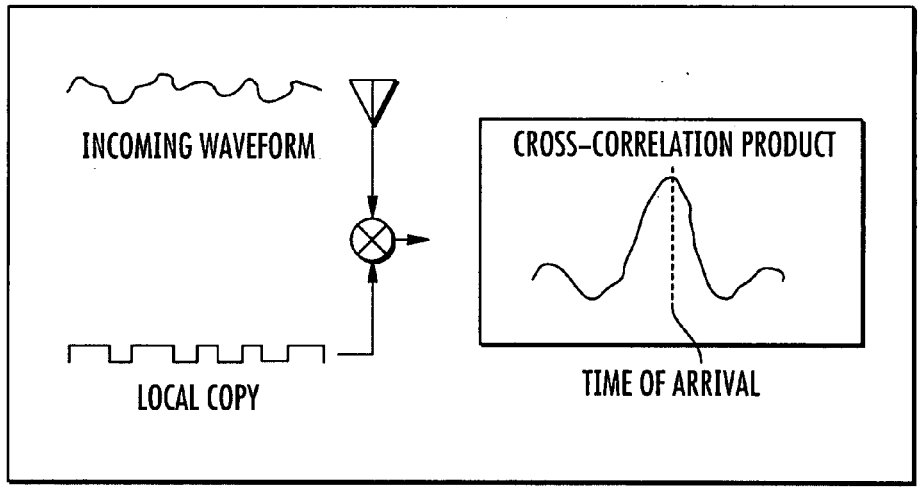
FIG. 3 is a schematic diagram of how a cross-correlation product is determined according to the prior art.

Referring now to FIG. 3, the key to time-of-arrival ranging is accurate measurement of the cross-correlation peak. In TOA ranging, the information sent between the two involved devices is a unique waveform (e.g. a binary spread spectrum sequence). This sequence is selected to have good correlation properties inasmuch as the correlation side lobes of the unique waveform are low and the correlation peak is readily noticeable. At the receiver, this incoming unique waveform can be cross-correlated with a local version, to form the cross-correlation product. The most accurate time of arrival estimate can only be done at the PHY level by observing the location of this cross-correlation peak. The key to time-of-arrival ranging resolution is adequate signal bandwidth.

Figure 4:
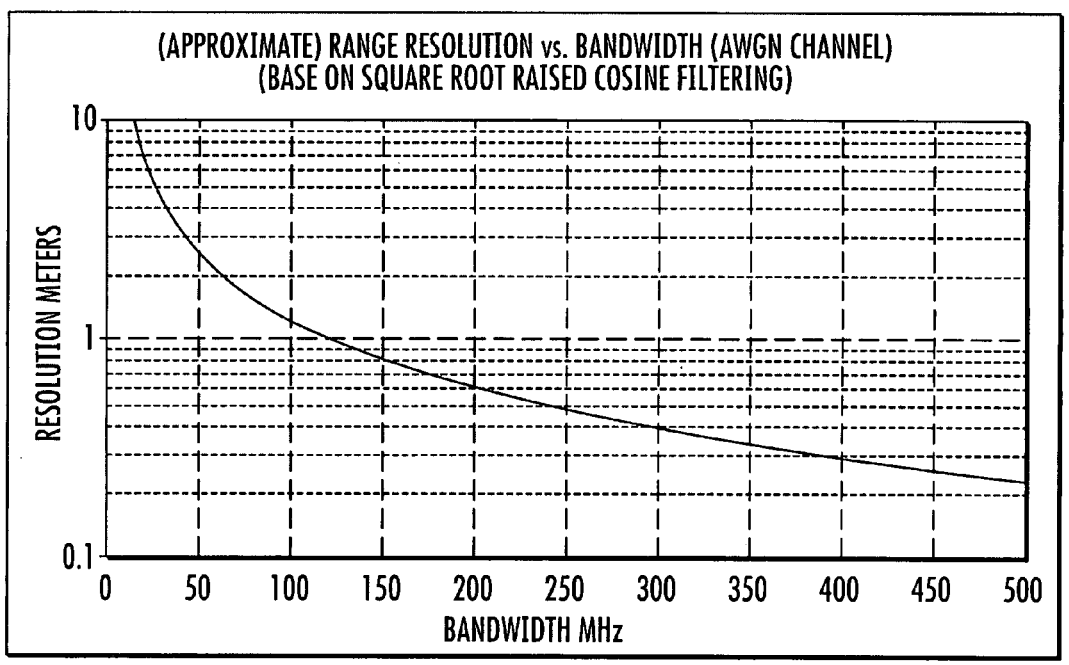
FIG. 4 is a graph depicting an example of range resolution versus bandwidth according to the prior art.
Figure 5:
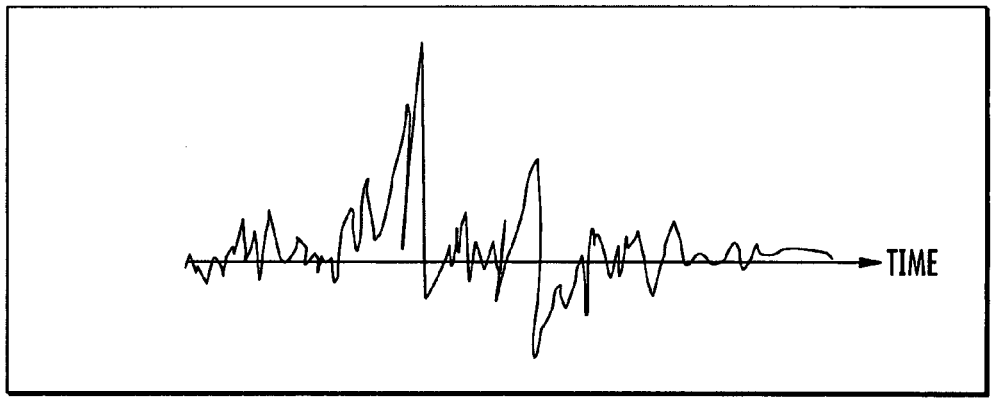
FIG. 5 is a graph of multi-path induced uncertainty in time-of-arrival ranging systems according to the prior art.

For instance, referring now to FIG. 4, in a free space AWGN channel, 1 meter resolution requires 125 MHz of bandwidth while 500 MHz of bandwidth offers approximately 25 cm of resolution in free space. However, in a multi-path channel the absolute accuracy can suffer considerably. This is because the multi-path "bounces" obscure the direct path. In this case the cross-correlation product becomes smeared and lost in the noise, as illustrated in FIG. 5. If one had an estimate of "about how far" away the unit of interest was, one could "zoom-in" on that range area to look for a subtle correlation peak.

Figure 6:
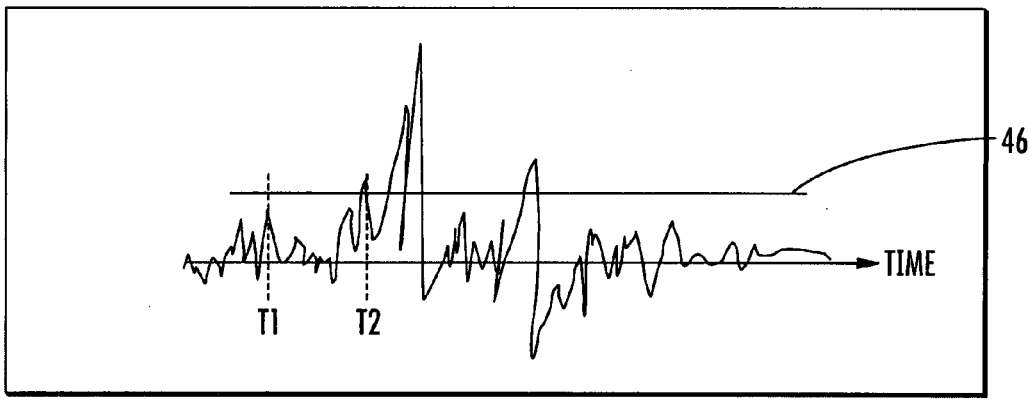
FIG. 6 is a graph of a first threshold used in the cross-correlation product in accordance with the invention.
Figure 7:
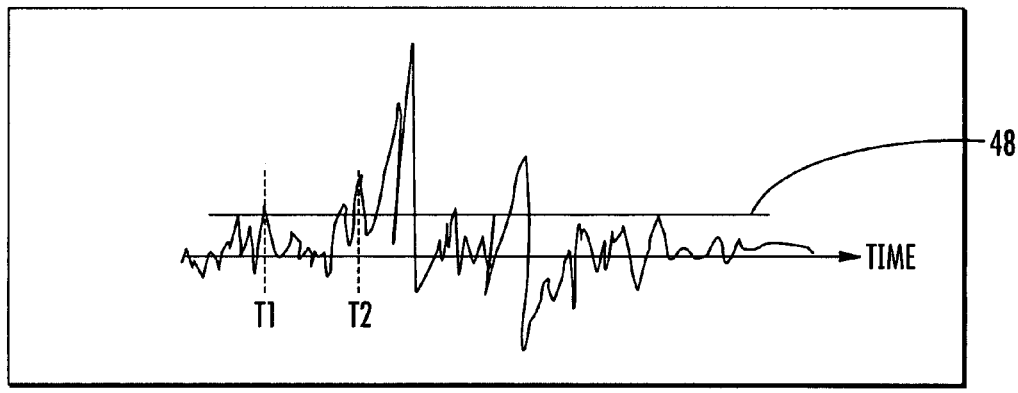
FIG. 7 is a graph of a second threshold used in the cross-correlation product in accordance with the invention.

The decision on which cross-correlation product is the earliest is somewhat arbitrary and can be estimated by setting a first threshold 46 as shown in FIG. 6. In this example with a first threshold 46, the selected earliest peak occurs at time T2. For a second threshold 48, the selected earliest peak occurs at time T1 as is illustrated in FIG. 7.

Figure 8:
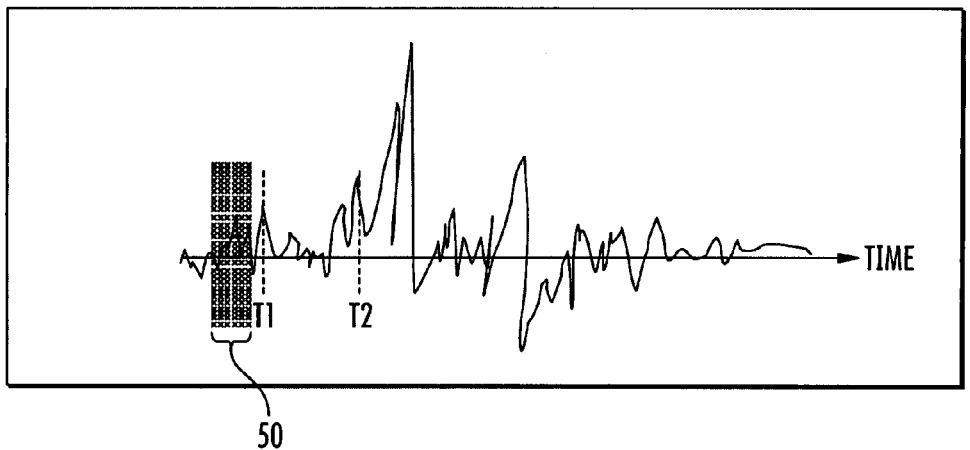
FIG. 8 is a graph of a range window used in accordance with the invention.

Now, if one had an estimate of the arrival time of the earliest direct path cross-correlation peak, one could set a range window 50 and look for the peak that falls within the vicinity of that window. This is illustrated FIG. 8 where the range window 50 is set based upon a TOA arrival time estimate. Now one can determine that the true direct path peak is at $T_0$.

Figure 9:
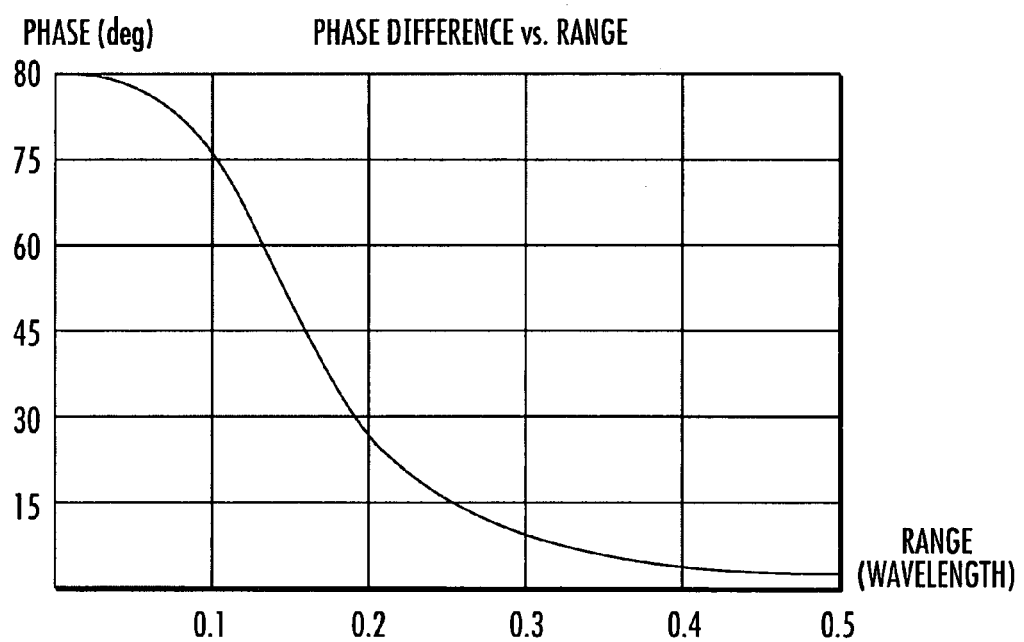
FIG. 9 is a graph depicting phase difference versus range for a near-field ranging system according to the prior art.

Another technique used to determine a range between two wireless units is a low frequency near-field ranging technique. Radio frequency (RF) signals are electromagnetic (EM) waves. These EM waves are a combination of an electric (E-field) wave and a magnetic (H-field) wave. Close to a transmit antenna, the electric and magnetic waves are in "phase quadrature," approximately 90° out of phase with each other. By the time these waves have traveled about a half wavelength (0.50 $\lambda$) from an antenna, however, the electric and magnetic waves are nearly synchronous, i.e. 0° phase difference. The phase quadrature between the electric and magnetic fields gradually vanishes as the waves move away from the transmit antenna as is shown in FIG. 9. By tracking this phase quadrature, precise distance measurements between two wireless units may be made. This technique is disclosed in U.S. Patent Application Publication No. 2004/0032363 to Schantz et al., the entire subject matter of which is incorporated herein by reference in its entirety.

The use of low frequency near-field techniques can take one of several forms, such as the E-H field phase alignment technique described above, near field signal strength techniques, and the like. Low frequency near-field signal strength ranging uses the relationship that the near-field signal strength falls off in a deterministic manner with distance from an antenna. This decrease in signal strength as one moves farther from the emitting antenna can be used to estimate one's distance from the antenna, and therefore, ascertain the range from the antenna. Another low frequency near-field ranging technique is described in U.S. Published Application No. 2004/0070534 to Halsey et al., the entire subject matter of which is incorporated herein by reference in its entirety.

A characteristic of the low frequency near-field ranging technique is that it has good obstacle penetration capability because in terms of a low frequency period, the additive multi-path components add, for all practical purposes, "in-phase" and are not harmful. This permits the near-field technique to operate effectively within a multi-path environment, which is difficult for TOA ranging techniques. Another near-field ranging technique characteristic is that the shorter the wavelength, the greater the accuracy of the technique. In addition, the near-field ranging technique has the characteristic that the ranging distance must be between 0.05 and 0.5 wavelengths. Consequently, the near-field ranging technique requires one to have a range estimate prior to setting the near-field EM ranging operating frequency.

As discussed above, multi-path degrades the accuracy of TOA ranging because the multi-path components obscure the location of the earliest arriving "direct path" signal. However, the near-field ranging technique works well in a multi-path environment, but the operating frequency of the near-field ranging approach should be chosen so that the wavelength distance between ranging units falls within a nominal distance of around 0.25 wavelengths.

To overcome the deficiencies of the TOA ranging and near-field ranging techniques, an estimate of the range between a first and second wireless unit may use the TOA technique to estimate the range between the first and second wireless unit. The estimated range generated by the TOA technique may then be used to pick the near-field ranging operating frequency. This range estimate can be in error by 50% and still be accurate enough to properly select the operating frequency for the near-field ranging technique. This range error is permissible because the operating wavelength selected should be between 0.05 to 0.5 wavelengths times the range between the first and second wireless unit. Optimal performance from the near-field ranging technique may use an operating frequency of 0.08 to 0.3 wavelengths times a range between a first and second wireless unit.

Figure 10:
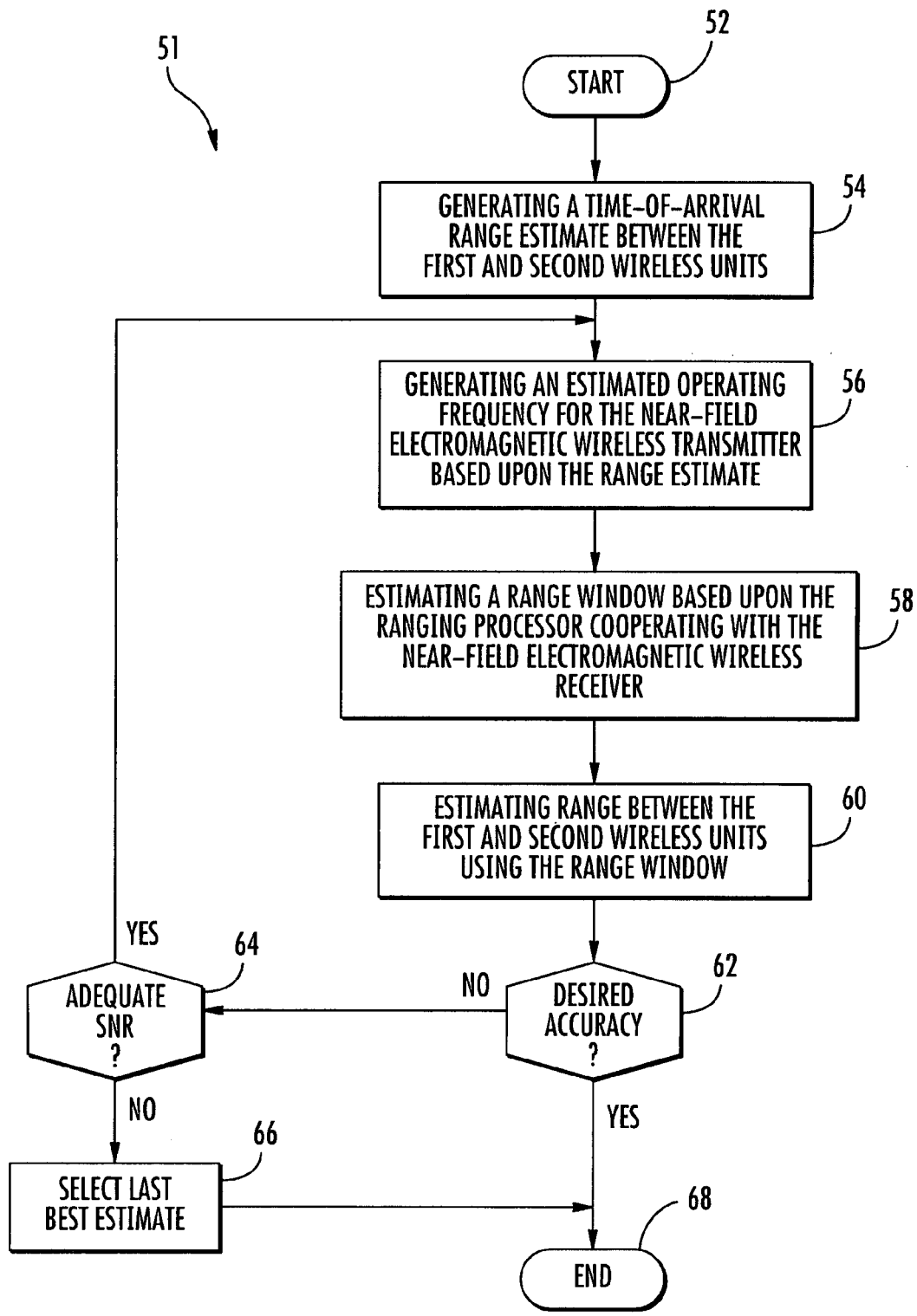
FIG. 10 is flowchart illustrating a method according to the invention.

For instance, a method aspect of the invention is for wireless ranging using a first wireless unit and a second wireless unit spaced therefrom. With reference to the flowchart 51 of FIG. 10, the method starts at Block 52, and includes generating a range estimate between the first and second wireless units via the ranging processor cooperating with the time-of-arrival wireless receiver, at Block 54. Then, generating an estimated operating frequency for the near-field electromagnetic wireless transmitter based upon the range estimate occurs at Block 56. The estimated operating frequency is sent to the near-field electromagnetic transmitter, which sends an electromagnetic signal to the electromagnetic receiver. The ranging processor cooperates with the near-field electromagnetic wireless receiver to estimate a range window at Block 58. The ranging processor estimates the range between the first and second wireless units using the range window at Block 60 to select the cross-correlation peak that falls within this range window.

The method can further include an iterative loop to control the level of accuracy desired by the wireless ranging system. For example, the method checks the level of accuracy at Block 62. If the range estimate is accurate enough, the method ends at Block 68. If the desired accuracy is not met, then the wireless ranging system determines if there is an adequate signal-to-noise (SNR) ratio at Block 64. If there is not an adequate SNR, then the time-of-arrival signal is lost in the noise and the last best near-field range estimate is selected at Block 66, and the method ends at Block 68. If there is an adequate SNR, then the method uses the last range estimate to estimate an operating frequency for the near-field electromagnetic wireless transmitter at Block 56.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and other embodiments are intended to be included within the scope of the appended claims.

That which is claimed is:

1. A wireless ranging system comprising:
a first wireless unit and a second wireless unit spaced therefrom;
said first wireless unit comprising
a time-of-arrival wireless transmitter, and
a near-field electromagnetic wireless transmitter having a settable operating frequency;
said second wireless unit comprising
a time-of-arrival wireless receiver cooperating with said time-of-arrival wireless transmitter,
a near-field electromagnetic wireless receiver cooperating with said near-field electromagnetic wireless transmitter, and
a ranging processor cooperating with said time-of-arrival wireless receiver for generating a range estimate between said first and second wireless units, and generating an estimated operating frequency for said near-field electromagnetic wireless transmitter based upon the range estimate.

2. The wireless ranging system according to claim 1 wherein said ranging processor cooperates with said near-field electromagnetic wireless receiver for estimating a range window for said time-of-arrival wireless receiver.

3. The wireless ranging system according to claim 2 wherein said ranging processor iteratively sets the operating frequency for said near-field electromagnetic wireless transmitter and range window for said time-of-arrival wireless receiver.

4. The wireless ranging system according to claim 1 wherein said second wireless unit further comprises a back-channel transmitter for transmitting the estimated operating frequency for said near-field electromagnetic wireless transmitter to said first wireless unit; and wherein said first wireless unit comprises a back-channel receiver cooperating with said back-channel transmitter for setting the operating frequency of said near-field electromagnetic wireless transmitter.

5. The wireless ranging system according to claim 1 wherein said time-of-arrival wireless transmitter comprises an ultra-wideband time-of-arrival wireless transmitter; and wherein said time-of-arrival wireless receiver comprises an ultra-wideband time-of-arrival wireless receiver.

6. The wireless ranging system according to claim 1 wherein said near-field electromagnetic wireless transmitter comprises an ultra-narrowband near-field electromagnetic wireless transmitter; and wherein said near-field electromagnetic wireless receiver comprises an ultra-narrowband near-field electromagnetic wireless receiver.

7. The wireless ranging system according to claim 6 wherein said ultra-narrowband near-field electromagnetic wireless receiver operates using at least one of a near-field phase alignment, a near-field signal strength measurement, and near-field phase differences.

8. The wireless ranging system according to claim 1 wherein the operating frequency of said near-field electromagnetic wireless transmitter defines an operating wavelength between 0.05 to 0.5 times a range between said first and second wireless units.

9. The wireless ranging system according to claim 1 wherein said second wireless unit further comprises an originating time-of-arrival transmitter; and wherein said first wireless unit further comprises a relay time-of-arrival receiver cooperating with said originating time-of-arrival transmitter and said time-of-arrival transmitter to provide roundtrip time-of-arrival ranging.

10. A wireless ranging system comprising:
a first wireless unit and a second wireless unit spaced therefrom;
said first wireless unit comprising
a time-of-arrival wireless transmitter, and
a near-field electromagnetic wireless transmitter;
said second wireless unit comprising
a time-of-arrival wireless receiver cooperating with said time-of-arrival wireless transmitter,
a near-field electromagnetic wireless receiver cooperating with said near-field electromagnetic wireless transmitter, and
a ranging processor cooperating with said near field electromagnetic wireless receiver to generate a range window for said time-of-arrival wireless receiver, and using the range window with said time-of-arrival wireless receiver to generate a range estimate between said first and second wireless units.

11. The wireless ranging system according to claim 10 wherein said ranging processor estimates the operating frequency of said near-field electromagnetic wireless transmitter based upon the range estimate between said first and second wireless units.

12. The wireless ranging system according to claim 11 wherein said ranging processor iteratively sets the estimated operating frequency for said near-field electromagnetic wireless transmitter and the range window for said time-of-arrival wireless receiver.

13. The wireless ranging system according to claim 12 wherein said second wireless unit further comprises a back-channel transmitter for transmitting the estimated operating frequency for said near-field electromagnetic wireless transmitter to said first wireless unit; and wherein said first wireless unit comprises a back-channel receiver cooperating with said back-channel transmitter for setting the estimated operating frequency of said near-field electromagnetic wireless transmitter.

14. The wireless ranging system according to claim 10 wherein said time-of-arrival wireless transmitter comprises an ultra-wideband time-of-arrival wireless transmitter; and wherein said time-of-arrival wireless receiver comprises an ultra-wideband time-of-arrival wireless receiver.

15. The wireless ranging system according to claim 10 wherein said near-field electromagnetic wireless transmitter comprises an ultra-narrowband near-field electromagnetic wireless transmitter; and wherein said near-field electromagnetic wireless receiver comprises an ultra-narrowband near-field electromagnetic wireless receiver.

16. The wireless ranging system according to claim 15 wherein said ultra-narrowband near-field electromagnetic wireless receiver operates using at least one of a near-field phase alignment, a near-field signal strength measurement, and near-field phase differences.

17. The wireless ranging system according to claim 10 wherein the operating frequency of said near-field electromagnetic wireless transmitter defines an operating wavelength between 0.05 to 0.5 times a range between said first and second wireless units.

18. The wireless ranging system according to claim 10 wherein said second wireless unit further comprises an originating time-of-arrival transmitter; and wherein said first wireless unit further comprises a relay time-of-arrival receiver cooperating with said originating time-of-arrival transmitter and said time-of-arrival transmitter to provide roundtrip time-of-arrival ranging.

19. A method for wireless ranging using a first wireless unit and a second wireless unit spaced therefrom, the first wireless unit comprising a time-of-arrival wireless transmitter, and a near-field electromagnetic wireless transmitter having a settable operating frequency, and the second wireless unit comprising a time-of-arrival wireless receiver cooperating with the time-of-arrival wireless transmitter, a near-field electromagnetic wireless receiver cooperating with the near-field electromagnetic wireless transmitter, and a ranging processor connected to the time-of-arrival wireless receiver and the near-field electromagnetic wireless receiver, the method comprising:
generating a range estimate between the first and second wireless units via the ranging processor cooperating with the time-of-arrival wireless receiver; and
generating an estimated operating frequency for the near-field electromagnetic wireless transmitter based upon the range estimate.

20. The method according to claim 19 further comprising estimating a range window for the time-of-arrival wireless receiver via the ranging processor cooperating with the near-field electromagnetic wireless receiver.

21. The method according to claim 20 further comprising iteratively setting the operating frequency for the near-field electromagnetic wireless transmitter and the range window for the time-of-arrival wireless receiver by the ranging processor.

22. The method according to claim 19 wherein the second wireless unit further comprises a back-channel transmitter; wherein the first wireless unit further comprises a back-channel receiver; and further comprising transmitting the estimated operating frequency for the near-field electromagnetic wireless transmitter generated by the ranging processor from the back-channel transmitter to the back-channel receiver.

23. The method according to claim 19 wherein the near-field electromagnetic wireless transmitter comprises an ultra-narrowband near-field electromagnetic wireless transmitter; wherein the near-field electromagnetic wireless receiver further comprises an ultra-narrowband near-field electromagnetic wireless receiver; and further comprising operating the ultra-narrowband near-field electromagnetic wireless receiver using at least one of a near-field phase alignment, a near-field signal strength measurement, and near-field phase differences.

24. The method according to claim 19 further comprising selecting the estimated operating frequency of the near-field electromagnetic wireless transmitter to define an operating wavelength between 0.05 to 0.5 times a range between the first and second wireless units.

25. The method according to claim 19 wherein the second wireless unit further comprises an originating time-of-arrival transmitter; wherein the first wireless unit further comprises a relay time-of-arrival receiver; and further comprising providing roundtrip time-of-arrival ranging between the first and second wireless units based upon the relay time-of-arrival receiver cooperating with the originating time-of-arrival transmitter and the time-of-arrival transmitter.

26. A method for wireless ranging using a first wireless unit and a second wireless unit spaced therefrom, the first wireless unit comprising a time-of-arrival wireless transmitter, and a near-field electromagnetic wireless transmitter having a settable operating frequency, and the second wireless unit comprising a time-of-arrival wireless receiver cooperating with the time-of-arrival wireless transmitter, a near-field electromagnetic wireless receiver cooperating with the near-field electromagnetic wireless transmitter, and a ranging processor connected to the time-of-arrival wireless receiver and the near-field electromagnetic wireless receiver, the method comprising:
generating a range window for the time-of-arrival wireless receiver via the ranging processor cooperating with the near field electromagnetic wireless receiver; and
generating a range estimate between the first and second wireless units using the time-of-arrival wireless receiver with the range window.

27. The method according to claim 26 further comprising selecting, via the ranging processor, the estimated operating frequency cf the near-field electromagnetic wireless transmitter based upon the range estimate between the first and second wireless units.

28. The method according to claim 27 further comprising iteratively setting the estimated operating frequency for the near-field electromagnetic wireless transmitter and the range window for the time-of-arrival wireless receiver by the ranging processor.

29. The method according to claim 26 wherein the second wireless unit further comprises a back-channel transmitter; and wherein the first wireless unit further comprises a back-channel receiver; and further comprising transmitting the estimated operating frequency for the near-field electromagnetic wireless transmitter generated by the ranging processor over the back-channel transmitter to the back-channel receiver.

30. The method according to claim 26 wherein the near-field electromagnetic wireless transmitter comprises an ultra-narrowband near-field electromagnetic wireless transmitter; and wherein the near-field electromagnetic wireless receiver comprises an ultra-narrowband near-field electromagnetic wireless receiver; and further comprising operating the ultra-narrowband near-field electromagnetic wireless receiver using at least one of a near-field phase alignment, a near-field signal strength measurement, and near-field phase differences.

31. The method according to claim 26 further comprising selecting the estimated operating frequency of the near-field electromagnetic wireless transmitter to define an operating wavelength between 0.05 to 0.5 times a range between the first and second wireless units.

32. The method according to claim 26 wherein the second wireless unit further comprises an originating time-of-arrival transmitter; wherein the first wireless unit further comprises a relay time-of-arrival receiver; and further comprising providing roundtrip time-of-arrival ranging between the first and second wireless units based upon the relay time-of-arrival receiver cooperating with the originating time-of-arrival transmitter and the time-of-arrival transmitter.

* * * * *